United States Patent
Dijkhuizen et al.

[15] 3,674,716
[45] July 4, 1972

[54] MANUFACTURE OF POLYURETHANES USING ORGANIC VANADIUM COMPOUNDS AS CATALYSTS

[72] Inventors: Willem Dijkhuizen, Zuidlaren, Netherlands; Erich Termin, Niederkassel, Germany; Otto Bleh, Bergeheim/Sieg, Germany; Dieter Morgenstern, Rosrath, Germany

[73] Assignee: Dynamit Nobel Aktiengesellschaft, Troisdorf, Germany

[22] Filed: April 27, 1970

[21] Appl. No.: 32,340

[30] Foreign Application Priority Data

April 30, 1969 Germany................P 19 21 952.4

[52] U.S. Cl..............260/2.5 AB, 260/75 NB, 260/77.5 AB
[51] Int. Cl. ....................................C08g 22/04, C08g 22/44
[58] Field of Search ................260/2.5 AB, 75 NB, 77.5 AB

[56] References Cited

FOREIGN PATENTS OR APPLICATIONS

| 720,488 | 10/1965 | Canada.................................260/77.5 |
| 627,424 | 9/1961 | Canada.................................260/77.5 |
| 1,016,589 | 1/1966 | Great Britain.........................260/2.5 |

OTHER PUBLICATIONS

I&EC Product Research and Development, Volume 1, No. 4, December 1962, Pages 261–264.

*Primary Examiner*—Donald E. Czaja
*Assistant Examiner*—Ronald W. Griffin
*Attorney*—Burgess, Dinklage & Sprung

[57] ABSTRACT

In the manufacture of a polyurethane by the reaction of a polyol with a polyisocyanate in the presence of a catalyst and in the absence of water, the catalyst used is an organic vanadium compound, preferably a vanadium or vanadyl alcoholate or phenolate, having the formula

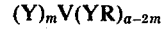

$$(Y)_m V(YR)_{a-2m}$$

wherein:
V is a vanadium atom
Y is an oxygen or sulfur atom
R is an organic radical, which can be alike or different if the molecule contains more than one
$a$ is 4 or 5
$m$ is 0 or 1 when $a$ is 4, and 1 when $a$ is 5.

9 Claims, No Drawings

MANUFACTURE OF POLYURETHANES USING ORGANIC VANADIUM COMPOUNDS AS CATALYSTS

PRIOR ART

Polyurethanes are made by reacting polyols with polyisocyanates according to the isocyanate addition polymerization process. Suitable polyols are: polyethers, polythioethers, polyesters, polyester amides and polyacetals. The polyisocyanates can be any of most of the types known today and are preferably di- and triisocyanates.

Either the so-called "one-shot" process or the "-prepolymer" process can be used for the addition polymerization.

The reaction between the isocyanate groups and the active H atoms of the polyols is usually accelerated by means of catalysts. Tertiary amines have long been known to have an accelerating action of this kind. In addition to the tertiary amines, organic metal compounds have been used as catalysts, examples being tin(II) octoate and di-n-butyl tin dilaurate. A catalytic action is also known to be possessed by organic metal compounds which have a co-ordinative bond in addition to an alcoholic bond between the metal and the organic radicals. Chelate compounds of this kind are, for example, the acetyl acetonates of zirconium, vanadium and titanium.

All of the prior-art catalysts, however, have disadvantages. For example, in many of them the accelerating action is insufficient. Acetyl acetonates are insoluble or insufficiently soluble in many reaction systems, so that little catalytic action can be obtained.

It is also known that, in the manufacture of polyester-polyisocyanate foams wherein water is used as the foam forming medium and a tertiary amine is used as the accelerator, the pore structure of the foam can be controlled to advantage by the addition of zirconium alcoholates which are derived from long-chained alcohols containing at least six carbon atoms.

With reference to the preparation of polyurethane casting compounds and foam materials the following are noted:
1. Saunders-Frisch, "Polyurethanes: Chemistry and Technology," Parts I and II, Interscience Publishers, 1962 and 1964.
2. Vieweg-Höchtlen, "Kunststoffhandbuch," Vol VII, Hanser-Verlag, 1966.

THIS INVENTION

It has now been found that in a water-free polyurethane reaction mixture the addition of vanadium or vanadyl alcoholates or phenolates which contain tetravalent or pentavalent vanadium has a catalytic action on the polyaddition reaction that is substantially stronger than the action of any catalysts known hitherto.

More specifically, the process of this invention for the manufacture of preferably non-foamed polyurethanes in a water-free system by the reaction of polyisocyanates with polyols in the presence of a catalyst is characterized in that there is used as a catalyst an organic vanadium compound of the general formula $$(Y)_m V(YR)_{a-2m}$$

which is soluble in the reaction mixture and has been prepared by condensation in whole or in part by the intermolecular or intramolecular loss of alcohol or thioalcohol, or phenol or thiophenol as the case may be. In the formula, Y represents oxygen or sulfur, $a$ is 4 or 5, preferably 5, $m$ is 0 or 1 when $a = 4$, and 1 when $a = 5$, and R is an organic radical, that can be alike or different if more than one is present, of the group cycloalkyl, arylalkyl, alkylaryl, aryl, or branched or unbranched alkyl radicals having one to five carbon atoms and having in some cases an oxygen or sulfur atom between two carbon atoms.

THE CONVENTIONAL REACTANTS

The polyols used are preferably polyether polyols having a functionality in relation to isocyanate groups of 2 to 9 and hydroxyl numbers of 30 to 600. Such polyether polyols can be prepared by the reaction of polyvalent alcohols with alkylene oxides. In this case the polyvalent alcohols can be, for example, glycerin, trimethylol propane, pentaerythritol, sorbitol, glucose and saccharose. Suitable alkylene oxides are, for example, propylene oxide, 1,2-, 1,3-, and 2,3-epoxybutane, styrene oxide and epichlorhydrin. Mixtures of these substances with up to 30 percent by weight of ethylene oxide can also be used. Preferably, however, polyether polyols are used which have been obtained by a reaction of this kind under acid catalysis, as for example by the use of boron trifluoride. It is characteristic of such polyether polyols that they contain a considerable amount of primary OH groups in addition to secondary OH groups.

One preferred process of preparation is described, for example, in British Pat. No. 1,016,589. In all these polyols on a saccharide basis which are used according to the invention, it is, of course, possible to start out with starch, which, as it is commonly known, can easily be transformed to mono- or oligosaccharides.

Also usable as polyols in the meaning of the invention are polyethers on a basis of ethylene diamine and/or diethylenetriamine-alkylene oxides, or polyesters, on a basis of adipic acid and ethylene glycol having terminal OH groups.

Lastly, polyethers, such as those obtainable by the addition polymerization of epoxy compounds and water, can be used as polyhydroxyl compounds according to the invention. Examples are polyethylene oxide, polypropylene oxide, poly-1,2-butylene oxide and polyepichlorhydrin. Polybutylene oxide can also be obtained by the polymerization of tetrahydrofuran.

In the polyols obtained according to British Pat. No. 1,016,589 and other polyether polyols, most of the acetyl acetonates or chelates are not soluble or are insufficiently soluble while the vanadium-containing catalysts used according to the invention are readily soluble therein.

All of the isocyanates commonly used today in the polyurethane art are usable according to the invention as polyisocyanates. Di- and triisocyanates are preferred. Examples are: aliphatic and aromatic bivalent and polyvalent isocyanates, such as alkylene diisocyanates like tetra- and hexamethylene diisocyanate, arylene diisocyanates, and corresponding acylation products such as m- and p-phenylene diisocyanate, naphthylene diisocyanate, diphenylmethane diisocyanate, toluylene diisocyanates such as 2,4- and 2,6-toluylene diisocyanate and their mixtures, di- and triisopropylbenzene diisocyanate and triphenylmethane triisocyanate, p-isocyanatophenylthiophosphoric acid triester, p-isocyanatophenylphosphoric acid triester, aralkyl diisocyanates such as 1-(isocyanatophenyl)-ethyl isocyanate or m- and p-xylylenediisocyanate, as well as polyisocyanates of the above-listed types which are substituted by various groups, such as alkoxy-, aryloxy-, -NO$_2$ and -Cl; also polyphenyl-polymethylenepolyisocyanate which is obtained by aniline-formaldehyde condensation followed by phosgenation; and the products of the reaction of the above-mentioned isocyanates with an insufficiency of polyhydroxyl compounds such as, for example, trimethylene propane, hexanetriol, glycerin and butanediol. Furthermore, polyisocyanates masked by phenols or bisulfite and polymerized isocyanates having an isocyanurate ring structure can also be named here by way of example.

Preferably, the process of this invention only the polyhydroxyl compounds are reacted with the isocyanates. The ratio of quantities is selected so that there will be about 0.4 to 2.0 isocyanate groups per hydroxyl group. Preferably, there should be about one isocyanate group for each hydroxyl group. The water-free polyol is mixed at room temperature or at ambient temperature with the isocyanate and the vanadium-containing catalyst and, if desired, with fillers and/or surface-active substances and, if desired, with blowing agents. The reaction mixture thus prepared can be reacted in a mold, if desired.

Cross-linking agents of the prior art can also be used, such as glycol, butanediol, ethylene-diamine, 1,3-diaminopropane, 4,4'-diaminodiphenylmethane and hydrazine. The procedure then to be followed will be either the one-shot process or the prepolymer process. With these procedures it will often be necessary to modify the ratio of the quantities of the reactants, but the ratio is easy to determine by experiment. Generally speaking, the isocyanate will be in an excess in regard to the polyol, while the cross-linking agent is present in a less than stoichiometric quantity.

THE NEW CATALYST

The catalysts used according to the invention are vanadium and vanadyl alcoholates and phenolates containing tetravalent or pentavalent vanadium, and the corresponding vanadium compounds in which the oxygen atoms attached to the vanadium atom are replaced wholly or partially by sulfur atoms. These vanadium compounds are derived, for example, from primary, secondary or tertiary aliphatic alcohols or trialcohols having up to five carbon atoms, which can additionally contain oxygen or sulfur bridges in the aliphatic hydrocarbon radicals. Also suitable are vanadium compounds which are derived from cycloaliphatic alcohols or from arylalkyl alcohols, the analogous thioalcohols being included. Furthermore, those vanadium compounds are also usable as catalysts according to the invention which derive from phenols or thiophenols containing, if desired, alkyl groups on the aromatic ring, or from a number of different compounds containing hydroxyl groups—e.g., from aliphatic and aromatic compounds. Lastly, the corresponding condensation products of the vanadium compounds already enumerated can be used as catalysts according to the invention, such as those formed by the loss of alcohol or thioalcohol, or by the loss of phenol or thiophenol, as the case may be.

Preferred catalysts are those condensation products which correspond to the general formula:

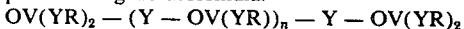

$$OV(YR)_2 - (Y - OV(YR))_n - Y - OV(YR)_2$$

wherein V, Y and R have the meaning stated previously, O is an oxygen atom, $n$ is a number between 0.2 and 10.

In detail, the following are useful: vanadyl triisopropylate, vanadyl tri-n-butylate, vanadyl triisoamylate, vanadyl tri-t-butylate, vanadyl tricyclohexanolate, vanadyl tribenzylthiopropylate, vanadium tetra-n-butylate, vanadium tetraethylate and vanadium tetraisopropylate.

It is essential that the catalysts be soluble in the reaction mixture. The use of vanadium or vanadyl acetyl acetonate or generally of chelates of vanadium does not come within the scope of this invention, for this reason.

ADVANTAGES

Because of the high activity of the present catalysts, less of the catalyst has to be used to achieve the same effect as compared to prior art catalysts. Thus there is a saving in costs. The quantity of the catalyst used in 0.001 to 1.0 percent of the weight of the polyol used, preferably 0.005 to 0.1 percent.

Another advantage of the catalysts of this invention is that the polyaddition takes place completely, resulting in the production of polyurethanes which are characterized by outstanding mechanical and electrical properties. The improvement in mechanical properties is particularly apparent in the manufacture of glass fiber reinforced polyurethanes, as, for example, by the winding process, and in the use of polyurethanes as binding agents for porphyritic corundum in making wear-resistant surfaces in road construction. In the latter case, the fast setting action of the catalyst is of great importance.

In casting processes based on this invention it is apparent that the removal of the heat of reaction is very good even in the case of thick-walled castings. Castings are obtained which are free of streaks and inhomogeneities. This contributes toward the formation of good mechanical properties, such as high resistance to fracture and high tensile strength. The castings have a good modulus of elasticity and a high impact strength.

The reaction takes place faster than when conventional catalysts are used. The increase in the speed of the reaction and hence the reduction of the time to stripping from the molds is quite considerable.

In the preparation of sheet materials and films, the present process offers still another advantageous effect. Sheet materials made on a basis of polyurethane generally have an irregular surface containing bubbles. This is not always to be attributed merely to moisture in the starting products from which the polyurethane is made, but often has its cause in the moisture content of the ambient air. The water reacts with isocyanate groups in the surface layers of the reaction mixture, and this side-reaction leads to the development of $CO_2$ and bubbles. In the process according to the invention, the presence of the vanadium compounds results in such an acceleration of the reaction between the isocyanate and polyhydroxyl compounds and cross-linking agent if used, that atmospheric moisture has little chance to compete in the reaction. No formation of bubbles occurs. The sheets and films surprisingly have a uniform, smooth surface. It furthermore has been observed that the initial stickiness of the surface very quickly vanishes.

Organic propellants which vaporize at the reaction temperature, preferably halogen alkanes or alkenes, can be added in a known manner to the reaction mixture containing the vanadium compounds for the purpose of making foam. The following substances are examples: trichlorofluoromethane, chlorodifluoromethane, dichlorodifluoromethane, 1,1-dichlorethylene and trichloroethylene. The blowing agent is usually mixed with one of the reactants, preferably the polyol, before the final reaction mixture is prepared. Usually cell regulators, stabilizers and, in some cases, emulsifiers are added during the manufacture of foam materials. Examples of suitable cell regulators are organic silicon compounds.

In comparison to foaming processes of the prior art, the foaming process of the invention has one peculiarity which is very advantageous in the manufacture of hard foams. If organic tin substances are used as catalysts in one case, and vanadium compounds are used according to the invention in the other, in such a concentration in each case that the foaming after the mixing of the reactants takes place at the same time (i.e., the mixtures have the same foam point), the period that elapses between the foam point and the solidification of the foam (setting time) is much shorter in the first case than in the second. A long period of time is very desirable inasmuch as the hard foam can be blown to maximum volumes, thereby achieving an optimum filling-up of the space designed to contain the foam in cases, for example, involving the creation of thermal insulating layers. Although the time period involved can be lengthened in the processes involving organic tin compounds by using less of the catalyst, this is not always practical because this could very materially delay the beginning of the foaming action (the foam point) and make the process inefficient.

The prolongation of the time period between the foam point and the setting point which is produced by using the catalyst of this invention has the additional, very desirable effect of producing a very homogeneous pore structure in the resultant hard foam. The same desirable pore structure is also obtained when the foaming is performed in a mold. The new process can thus be used in so-called structural or integral foaming processes, which have been described and discussed, for example, in "Modern Plastics," Dec. 1968, pp. 69 to 72, and in "British Plastics," January 1969, pp. 71–75. These integral foams have a pore-free, stable, enveloping polyurethane skin, and are already very important in the art and in the furniture industry. Since the making of integral foams can be efficient only if the strip time is short, the catalysis by vanadium compounds according to the invention is especially valuable for this technique.

It is to be noted that the foaming of polyurethanes by the simultaneous use of water as a reactant, and the formation of $CO_2$ resulting therefrom, does not come within the scope of this invention.

EXAMPLES

Example 1

The polyol in these experiments was a liquid product based on glucose and propylene oxide, such as made by acid catalysis according to British Pat. No. 1,016,589. It had an OH number of 269. 240 g of this polyol was placed in a half-liter agitator vessel and 24 g of a dispersion of 50 percent zeolite by weight in castor oil was added. Then the mixture was heated with stirring to 100°C and at the same time the pressure in the reactor was reduced to about 10 mm Hg. These reaction conditions were sustained for 3 hours. Then the mixture was cooled to 25°C and the pressure was restored to normal.

181.5 g of the homogeneous, liquid product was taken from the reactor and poured into a 500 ml beaker, and 0.022 g of vanadyl triisopropylate was added, and dissolved with stirring. With further intense stirring, 118.6 g of a highly viscous, solvent-free polymethylene-polyphenylisocyanate having a molecular weight of about 390 and an isocyanate content of about 32 percent by weight was poured into the beaker. After a brief period the addition polymerization started, with a yield of heat. The mixture was immediately cast in molds for test specimens measuring 10 × 15 × 120 mm. The rods were removed 60 minutes after casting and heated for 3 hours at 110°C in a drying oven.

On the following day, the bending test of DIN 53,452, the impact bending test of DIN 53,453, and the test for stability of shape under heating of DIN 53,461 were performed. The following values resulted (average of five individual measurements):

Bending strength: 900 kg/cm²
Modulus of elasticity (from bending test on the basis of Hook's law): 27,000 kg/cm²
Impact toughness: 34.6 kp/cm/cm²
Stability of shape under heat: 48°C.

Comparative Test:

In a second batch, the same formula was followed, except that, instead of 0.022 g of vanadyl triisopropylate, 0.098 g of dibutyl tin dilaurate was added as catalyst to the reaction mixture. In this case, again, the setting time was about 30 minutes for this second batch. The castings were tested according to the same DIN standards, the results being as follows:

Bending strength: 730 kg/cm²
Modulus of elasticity: 23,300 kg/cm²
Impact toughness: 16.1 kp cm/cm²
Stability of shape under heat: 47°C.

Examples 2 to 7

In the following examples, the procedure was the same as in Example 1, except that in some cases other substances than those used in Example 1 were employed. In some cases, instead of the polyol based on glucose and propylene oxide with an OH number of 269, polyols were used which had been analogously obtained and had OH numbers of 314 or 210. The polymethylene-polyphenylisocyanate was replaced in a number of experiments with a liquid, solvent-free polyisocyanate mixture which contained as its main component diphenylmethane-4,4'-diisocyanate with an effective content of 92 mole-percent. Each experiment was performed once with vanadyl triisopropylate and once with dibutyltin dilaurate as the catalyst. The amount of catalyst in each case was selected so that the setting time of the reaction mixture amounted to approximately 30 minutes.

The material was also tested as specified in Example 1.

The bending strengths and impact toughnesses were approximately the same as those in Example 1, but the modulus of elasticity values were much higher when vanadyl triisopropylate was used. The values are listed in Table 1. In judging the results of the experiments, it is to be especially noted that the amount of conventional stannous catalyst used was substantially greater than the amount of the vanadium-containing catalyst according to the invention.

Example 8

In this experiment, the polyol was also a liquid product based on sorbitol and propylene oxide, alkalinely catalyzed. It had an OH number of 480. 50 g of this polyol was well mixed with 1 g of a hydroxyalkylated polysiloxane, 18 g of the blowing agent trichlorofluoromethane, and 0.5 g of vanadyl triisopropylate. Lastly, 61 g of the same isocyanate mixture on a diphenylmethane-4,4'-diisocyanate basis as was used in Example 2 was added with strong stirring to this mixture. Foaming started after 32 seconds. 80 seconds after the addition of the isocyanate, the surface of the foamed body had lost its stickiness. 110 seconds after the addition of the isocyanate, no further expansion of the body could be detected; the rise time therefore amounted to 110 seconds.

Comparative Test:

In the comparative test the same formula was used except that 0.6 g of di-n-butyl tin dilaurate was used instead of 0.5 g of vanadyl triisopropylate. The foam point (start time) was 35 seconds. The surface was non-sticky 60 seconds after the mixing. The rise time amounted to only 95 seconds. As a result of the short rise time, the final volume of the foamed body, which was in an L shape, was considerably smaller than in the principal experiment.

Examples 9 to 36

In the following experiments the polyol was a liquid product on a basis of glucose and propylene oxide, such as can be made by acid catalysis according to British Pat. No. 1,106,589. It had an OH number of 314. It was dehydrated with zeolite as explained in Example 1. Further processing to polyurethane was performed according to the formula in Example 1, except that in Examples 9–28 vanadium catalysts other than vanadyl triisopropylate were used, and different quantities were used, and in Examples 30–36 representative prior art procedures were used. The last experiment was performed without the employment of a catalyst.

In Table 2 are listed the setting times and temperatures in relation to the amount of catalyst involved. It is apparent from these figures that the vanadium catalysts of this invention are considerably more active than the catalysts of the prior art.

TABLE 1

| Example No. | Isocyanate Compound | Quantity for 181.5 g. of polyol, g. | OH No. | Catalyst type | Quantity as percent of weight of the polyol | Modulus of elasticity, kg./cm.² |
|---|---|---|---|---|---|---|
| 2a | Diphenylmethane-4,4'-diisocyanate | 137.6 | 314 | V | 0.013 | 29,000 |
| 2b | do | 137.6 | 314 | Sn | 0.034 | 24,600 |
| 3a | do | 118.6 | 269 | V | 0.012 | 26,400 |
| 3b | do | 118.6 | 269 | Sn | 0.054 | 25,000 |
| 4a | do | 100.0 | 210 | V | 0.007 | 17,000 |
| 4b | do | 100.0 | 210 | Sn | 0.037 | 14,000 |
| 5a | Polymethylenepolyphenylisocyanate | 137.6 | 314 | V | 0.006 | 29,500 |
| 5b | do | 137.6 | 314 | Sn | 0.170 | 26,000 |
| 6a | do | 118.6 | 269 | V | 0.012 | 23,000 |
| 6b | do | 118.6 | 269 | Sn | 0.168 | 21,000 |
| 7a | do | 100.0 | 210 | V | 0.012 | 16,400 |
| 7b | do | 100.0 | 210 | Sn | 0.180 | 5,700 |

TABLE 2

| Example No.: | Catalyst Type | Quantity in percent of wt. of the polyol | Setting time, min. | Setting temp., °C |
|---|---|---|---|---|
| 9 | Vanadyl-n-butylate | 0.007 | 48 | 59 |
| 10 | do | 0.014 | 27 | 62 |
| 11 | do | 0.042 | 11 | 70 |
| 12 | Vanadyl isobutylate | 0.007 | 54 | 57 |
| 13 | do | 0.014 | 29 | 74 |
| 14 | do | 0.042 | 11 | 63 |
| 15 | Vanadyl-tert.-butylate | 0.007 | 65 | 57 |
| 16 | do | 0.014 | 33 | 62 |
| 17 | do | 0.042 | 12 | 73 |
| 18 | Vanadyl isopropylate | 0.007 | 48 | 56 |
| 19 | do | 0.014 | 28 | 56 |
| 20 | do | 0.042 | 10 | 58 |
| 21 | Vanadyl cyclohexanolate | 0.007 | 50 | 62 |
| 22 | do | 0.014 | 26 | 64 |
| 23 | do | 0.042 | 11 | 75 |
| 24 | Vanadyl methylglycolate | 0.007 | 59 | 40 |
| 25 | do | 0.014 | 30 | 60 |
| 26 | do | 0.042 | 12 | 60 |
| 27 | Vanadyl phenolate | 0.0.4 | 54 | 53 |
| 28 | do | 0.042 | 25 | 68 |
| Comparative Example: | | | | |
| 30 | Dibutyl tin diversatate* | 0.014 | 121 | 35 |
| 31 | do | 0.042 | 64 | 42 |
| 32 | Dibutyl tin dilaurate | 0.014 | 137 | 36 |
| 33 | do | 0.042 | 68 | 42 |
| 34 | Lead octoate | 0.014 | 137 | 36 |
| 35 | do | 0.042 | 137 | 30 |
| 36 | No catalyst | | 137 | 30 |

*This compound is derived from a mixture of organic-acids of the general formula $$CH_3-\underset{R^2}{\overset{R^1}{C}}-COOH$$

wherein $R^1$ and $R^2$ represent alkyl radicals having a total of 7 carbon atoms, and it is known under the commercial name "Versatic Acid."

We claim:
1. In the manufacture of a polyurethane by the reaction of a polyol with a polyisocyanate in the presence of a catalyst and in the absence of water, the improvement comprising using as said catalyst an organic vanadium compound soluble in the reaction mixture and having the formula:

$$O_m V(OR)_{a-2m}$$

wherein:
R is an organic radical selected from the group consisting of cycloalkyl, aryl alkyl, alkylaryl, aryl and alkyl having in the range of 1 to 5 carbon atoms, which alkyl radicals can be branched or contain oxygen or sulfur atoms in the chain
$a$ is 4 or 5
$m$ is 0 or 1 when $a$ is 4, and 1 when $a$ is 5.

2. The process of claim 1 wherein said polyol is a polyether polyol having a functionality in relation to isocyanate groups of 2 to 9 and a hydroxyl number of 30 to 600, and said catalyst is present in an amount in the range of 0.001 to 1.0 weight percent, based on said polyol.

3. The process of claim 2 wherein said polyether polyol is prepared by the acid catalyzed reaction of a polyvalent alcohol with an alkylene oxide.

4. The process of claim 1 wherein said organic vanadium compound has the formula:

$$OV(OR)_2-O-OV(OR)_n-O-OV(OR)_2$$

wherein $n$ is in the range of 0.2 to 10.

5. The process of claim 1 wherein said organic vanadium compound has the formula:

$$OV(OR)_3$$

6. The process of claim 5 wherein said organic vanadium compound has the formula:

$$OV(OR)_3$$

wherein R has three to six carbon atoms.

7. The process of claim 1 wherein said vanadium compound is selected from the group consisting of vanadyl propylates, butylates, cyclohexanolates, methylglycolate and phenolate.

8. The process of claim 2 wherein a foam-forming ingredient other than water is added to the reaction mixture, and said polyurethane is a foamed polyurethane.

9. The process of claim 8 wherein said foam-forming ingredient is a halogenated alkane.

* * * * *